Patented July 23, 1946

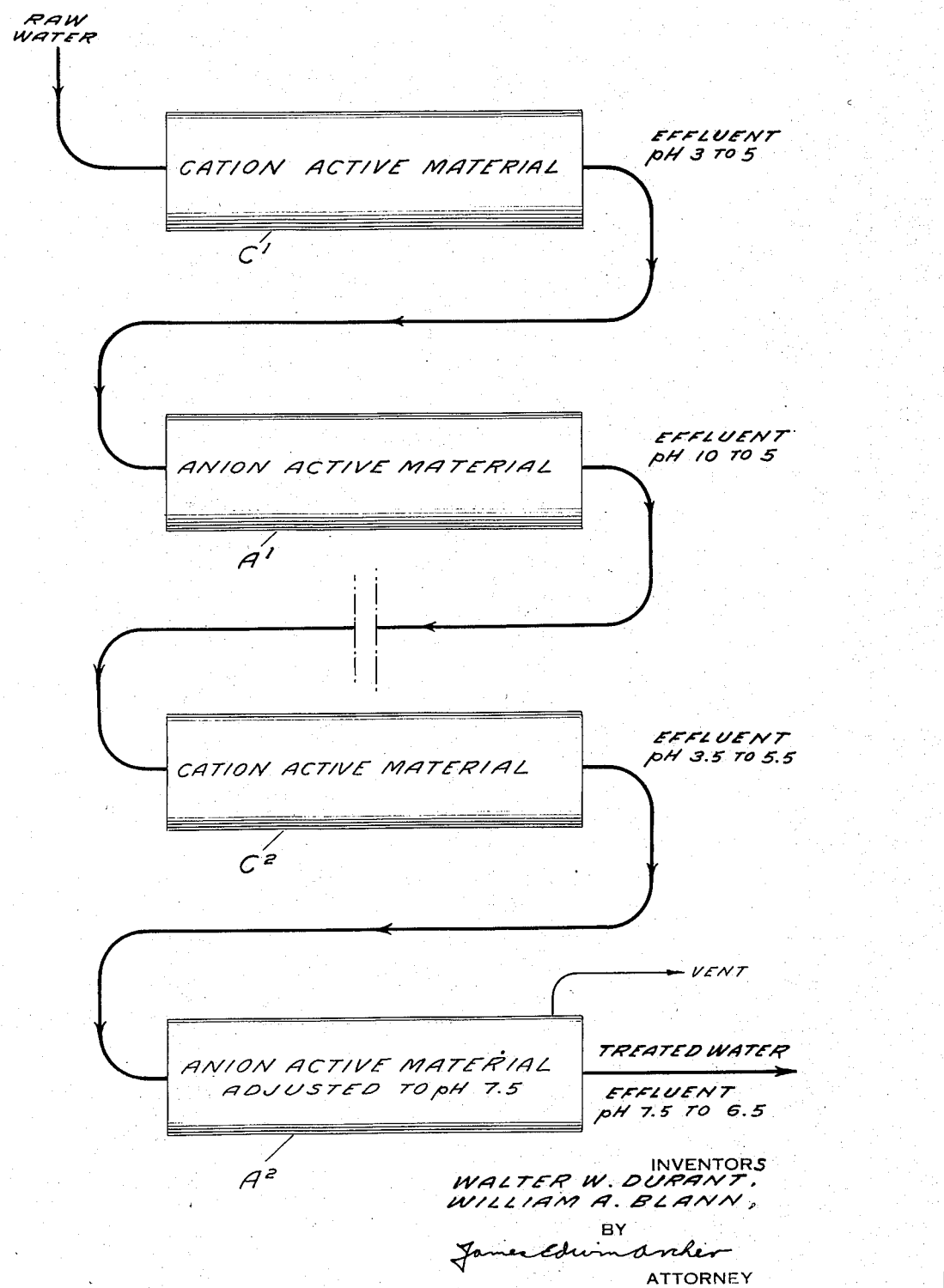

2,404,367

UNITED STATES PATENT OFFICE 2,404,367

WATER PURIFICATION

Walter W. Durant, Old Greenwich, and William A. Blann, Stamford, Conn., assignors to American Cyanamid Company, New York, N. Y., a corporation of Maine Application October 7, 1942, Serial No. 461,094

6 Claims. (Cl. 210—24)

This invention relates to the purification of water by means of ion active materials.

Previous methods of purifying water by means of ion active materials has resulted in the production of water having a pH ranging from about 10 to about 4. This water has generally contained a relatively high concentration of carbon dioxide and, in some instances, ammoniacal substances dissolved in the water. In order to remove the carbon dioxide and other volatile impurities it has been generally customary to aerate the water. This has a very definite disadvantage since the water must be repumped after the aeration.

In order to obtain water which is substantially neutral by the prior art methods, it is necessary to discard large volumes of relatively pure water at the beginning of the cycle. Furthermore, if the feed water being purified contains a high mineral content, the beds of ion active materials must be rinsed after activation with a portion of the purified water, thus appreciably reducing the output of the unit.

It is, therefore, an object of our invention to provide a process for the purification water which substantially reduces the normal rinse water loss.

Another object of our invention is to produce water which is substantially neutral.

Still another object of our invention is to provide a process for the production of water of the distilled water quality by means of anion active materials and cation active materials.

The drawing is a flow sheet illustrating one embodiment of our process. Raw or untreated water flows through a bed of cation active material, C1, and thence through a bed of anion active material, A1. The water flowing from bed A1 may be passed through another bed of cation active material, C2, or it may be passed through one or more series of beds of cation active material and anion active material such as beds C1 and A1. This is indicated by the break in the flow lines between bed A1 and bed C2. The water flowing into bed C2 should have a low content of cations and anions. The effluent from bed C2 passes through a bed of anion active material which is adjusted so that the pH of water flowing therefrom will be about 7.5. Gas such as $CO_2$ which may be liberated may be vented off at convenient intervals of time.

The foregoing and other objects are attained by treating the water which contains a low content of cations and anions, e. g., less than about 20 P. P. M. of total solids, with a cation active material which is hydrogen activated and then with an anion active material which has been treated with a reagent to bring the pH of effluent water to about 7.5. Examples of suitable reagents are carbon dioxide, an aqueous solution of a mixture of an alkali metal carbonate and an alkali metal bicarbonate, etc.

The following examples are given by way of illustration and not in limitation:

Example 1

About 2 cubic feet of an anion active resin (for example, a resin prepared according to Example 1 of U. S. Patent No. 2,285,750) are packed into each of two columns about 10 inches in diameter and about 8 feet tall. Similarly, about the same quantity of a cation active material (e. g. resin "C") is packed into the same size beds. The cation active beds are activated by treatment with an acid solution. Optionally, the material may be pretreated with a dilute solution of a salt of an alkali metal such as sodium chloride. Such pre-treatment is preferable for reactivating cation active materials after being used in a previous cycle to remove alkali earth metals. One of the anion active resin beds (A1) is activated in the conventional manner by treatment with a dilute aqueous solution of an alkali, e. g., sodium carbonate, potassium carbonate, sodium hydroxide, potassium hydroxide, etc. The second anion active resin (A2) is activated in the same way and then given a special treatment so that the pH of the effluent water from the bed is about 7.5. This treatment may be accomplished in a number of ways. Conveniently, it is done by treating the activated bed with carbon dioxide. This treatment may be carried out by passing sufficient carbon dioxide through the bed filled with water so that the pH of the effluent will be 7.5 when water (low solids content) is passed through it. The bed may be treated with a dilute solution of sodium bicarbonate mixed with sodium hydroxide or sodium carbonate or other base to adjust it so that the pH of the effluent water is about 7.5. The four beds are connected together with the water supply as shown in the flow sheet in the accompanying drawing. The feed water enters bed C1 and the effluent therefrom passes into bed A1. The effluent from bed A1 passes through bed C2 and then through bed A2.

A feed water having the analysis indicated in the table below is passed through a system described above at a rate of about 1½ gallons per minute. The conductivity of the purified water flowing from the last bed A2 varies between about $1 \times 10^{-5}$ to about $1-2 \times 10^{-6}$ mhos per cc. This system may be operated for about six days during which time the pH of the water drops from about 7.5 to about 7. The pH then falls relatively rapidly to about 6.5–6 at which time the process is stopped and the beds of active material are reactivated in the manner described herein. The following table shows the analysis and pH of the water at the beginning, during, and after its passage through the system:

|  | Total solids | Nonvolatile solids | CO$_2$ | Silica as SiO$_2$ | pH |
|---|---|---|---|---|---|
|  | P. P. M. | P. P. M. | P. P. M. | P. P. M. |  |
| Feed water | 50 | 37 | 14 | 5 | 6.6 |
| Water after C1 | 21 | 6 | 20 | 6 | 3.5 |
| Water after A1 |  |  | 3 | 0.9 | 10–5 |
| Water after C2 |  |  | 5 |  | 4.5 |
| Water after A2 | 4 | 1 | 1 | 0.7 | 7.5–6 |

*Example 2*

A run similar to that in Example 1 is carried out on well water with the results shown in the following table:

|  | Total solids | Nonvolatile solids | Silica as SiO$_2$ |
|---|---|---|---|
|  | P. P. M. | P. P. M. | P. P. M. |
| Feed water | 280 | 219 | 32 |
| Water after A2 | 6 | 4 | 2.3 |

During the operation of the system with this well water we use the raw water in preparing our activating solutions as well as for rinse water after the beds are activated. Bed C1 is rinsed with an amount of raw water approximately equal to its volume, this rinse being discarded. Bed A1 is rinsed with a volume of effluent from bed C1 equal to its volume and this is discarded. Bed C2 is rinsed with the effluent from bed A1, one volume discarded and bed A2 is rinsed with effluent from bed C2 and rinsed until the water meets the desired specifications. Usually 1–6 times the volume of a single resin bed of the water flowing from bed A2 is discarded after which the water is suitable for consumption. This example shows that our four-bed system enables one to produce a high quality water from well waters containing a high proportion of mineral matter. It also shows that it does not require the large volumes of rinse water usually necessary with the ordinary two-bed system.

During the purification process carbon dioxide is removed by the last anion active bed A2 and some of it collects at the top of the bed. Accordingly, it is desirable that a vent be provided in the top of the bed in order that the carbon dioxide gas may be vented off periodically.

It will now be apparent that we are able to produce a purified water in accordance with our process which has about the same quality as distilled water and which does not contain the high proportion of silica and carbon dioxide characteristic of water purified by other known processes which utilize ion active materials. Up until the present we have not been able to formulate any exact explanation of the mechanism whereby the last anion active resin bed removes carbon dioxide from the water. It appears to be essential that the pH of water passing through the bed be about 7.5 after treatment with carbon dioxide or a solution containing a mixture of a bicarbonate and a base such as sodium carbonate or sodium hydroxide.

Our process may be operated in such a manner that the pH of the effluent from the first bed of cation active material is between about 3 and 5, the pH of the effluent from the first anion active bed ranges from 10 to 5, the pH of the effluent from the second bed of cation active material is between about 3.5 and 5.5 and the pH of the effluent from the second anion active bed is between about 7.5 and 6.5. If desired, the system may be operated until the pH of the effluent from the last anion active resin bed drops to 6 or thereabouts.

If the feed water contains a very high content of solids, it may be desirable to employ an additional set of cation active materials and anion active resins. In general, our system gives completely satisfactory results if the size of each of the beds of active material be adjusted for any particular water which is to be treated in accordance with the principles well-known in this art.

In place of part or all of the anion active resin used in the example other anion active materials may be substituted. Among these are the aldehyde condensation products of m-phenylene diamine, biguanide, guanyl urea, substituted guanidines such as methyl guanidine, substituted biguanides such as phenyl biguanide, polyamines, preferably the polyethylene polyamines, etc. Such condensation products are preferably formaldehyde condensation products although other aldehyde condensation products may be used if desired. Examples of other aldehydes are furfural, acrolein, benzaldehyde, etc. The active resins, such as those prepared from guanidine, guanyl urea, biguanide and other materials which do not form sufficiently insoluble condensation products with formaldehyde for most practical purposes, are preferably insolubilized with suitable formaldehyde reactive materials, e. g., urea, thiourea, the aminotriazines (especially melamine and the guanamines which react with formaldehyde to produce insoluble products), etc. The anion active resins prepared from guanidine, guanyl urea, biguanide, etc. may be prepared in the same general manner as described in U. S. Patents Nos. 2,251,234 and 2,285,750. Usually it is convenient to use the salts of the bases but the free bases may also be used. Examples of suitable salts for use in the preparation of anion active resins are guanidine carbonate, guanidine sulfate, biguanide sulfate, biguanide nitrate, guanyl urea sulfate, guanyl urea nitrate, guanyl urea carbonate, etc. U. S. Patents Nos. 2,251,234 and 2,285,750 describe methods of preparing many anion active resins of the aforementioned types.

*Preparation of resin "C"*

About 570 parts of water and about 2.45 parts of sodium hydroxide (97%) are agitated in a kettle by means of a mechanical agitator to form a solution having a pH of about 11.8. A mixture of about 104.4 parts of acetone and 181 parts of furfural is added slowly over a period of about 1 hour, during which time the temperature is maintained at about room temperature and the reacting mixture is agitated. The reacting mixture is stirred for an additional hour, after which a solution of about 3.06 parts of sulfuric acid (95.5%) and 3.06 parts of water is added to bring the pH to about 7. About 187.2 parts of sodium bisulfite are added and the reaction mixture is heated to about 95° C. over a period of about 30 minutes. An exothermic reaction occurs and causes the temperature to rise to 100° C. After the exothermic reaction subsides the reacting mixture becomes clear and it is then refluxed for about ½ hour. The product is cooled to about 50° C. and a solution of 122.4 parts of sulfuric acid and 194 parts of water are added, followed by the addition of 271.8 parts of furfural. The reacting mixture is agitated for about 70 minutes during which time the temperature is maintained at about 50–55° C. The resulting solution is discharged into molds where after about 50 minutes it gels. The gel is aged about 16–18 hours and granulated to pass through an 8 mesh screen. The granulated resin is spread on trays and placed in an oven maintained at 50° C. for about 2–4 hours, raised to about 100°–135° C. over a period of about 1 hour and maintained at 100°–135° C. for about 4–9 hours. The product has a capacity for the absorption of cations equivalent to about 17,000 grains of calcium carbonate per cubic foot of resin and a packed density of about 24–27 pounds per cubic foot.

Other examples of suitable cation active materials which may be used in the hydrogen cycle (activated with acid) are: polyhydric phenolaldehyde condensation products such as the catechol-tannin-formaldehyde condensation products, aromatic sulfonic acid-formaldehyde condensation products (as described in U. S. Patent No. 2,204,539), the carbonaceous zeolites, i. e., the sulfated or sulfonated carbonaceous materials such as coal, peat, lignite, etc. Any of these materials may be used in the hydrogen cycle (activated with acid) and they are therefore suitable for use in accordance with our invention. Broadly speaking, these substances may be termed "hydrogen zeolite."

Cation active materials may be regenerated by passing dilute acid solutions, e. g., 10% of hydrochloric acid, sulfuric acid, etc., through the bed and subsequently washing with water until substantially free of the acid used. If the water flowing into cation active bed C1 be one containing a high concentration of calcium, it may be desirable to activate the bed with a salt solution such as an aqueous solution of sodium chloride before activation with the acid.

Our process is suitable for producing water of distilled water quality or a high grade drinking water. The system which we employ has the important advantage that a very small quantity of rinse water is required in the regeneration process and it provides a neutral water substantially free of volatiles without aeration.

Obviously, many modifications and variations in the processes and compositions described above may be made without departing from the spirit and scope of the invention as defined in the appended claims.

We claim:

1. In a process of purifying water, the steps which comprise passing water containing less than about 20 P. P. M. of total solids through a hydrogen zeolite and then through an anion active material which has been treated with a reagent to adjust the pH of effluent water flowing from said anion active material to about 7.5, said reagent being an aqueous solution of a carbonate and a bicarbonate and having a pH of about 7.5.

2. A process of purifying water, including the removal of carbon dioxide, which comprises passing raw water through a bed of hydrogen zeolite, then passing the water through a bed of an anion active material, passing the water through another bed of hydrogen zeolite and passing the water through a bed of an anion active material which has been so treated that the pH of effluent water is about 7.5, all of said beds being arranged in series.

3. A process of purifying water, including the removal of carbon dioxide, which comprises passing raw water through a bed of a hydrogen zeolite, then passing the water through a bed of an anion active material, then passing the water through another bed of a hydrogen zeolite, then passing the water through another bed of an anion active material, then passing the water through still another bed of a hydrogen zeolite and passing the water through a bed of an anion active material which has been so treated that the pH of effluent water is about 7.5, all of said beds being arranged in series.

4. A process of purifying water, including the removal of carbon dioxide, which comprises passing raw water through a bed of a hydrogen zeolite, then passing the water through a bed of an anion active material, passing the water through another bed of a hydrogen zeolite and passing the water having a pH of at least 3.5 through a bed of an anion active material which has been so treated that the pH of effluent water is about 7.5, all of said beds being arranged in series.

5. A process of purifying water, including the removal of carbon dioxide, which comprises passing raw water through at least one but not more than two pairs of beds of ion active materials including first, a bed of a hydrogen zeolite and secondly, a bed of an anion active material, passing the water therefrom through still another bed of a hydrogen zeolite and passing the water having a pH between about 3.5 and 5.5 through a bed of an anion active material which has been so treated that the pH of effluent water is about 7.5, all of said beds being arranged in series.

6. A process of purifying water, including the removal of carbon dioxide, which comprises passing raw water through at least one but not more than two pairs of beds of ion active material, including first a hydrogen zeolite and secondly, an anion active material, to produce water having not more than 20 P. P. M. of total solids therein, and passing such water through still another bed of a hydrogen zeolite and passing the water having a pH of 3.5–5.5, through a bed of an anion active material which has been so treated that the pH of effluent water is about 7.5, all of said beds being arranged in series.

WALTER W. DURANT.
WILLIAM A. BLANN.

DISCLAIMER 2,404,367.—*Walter W. Durant*, Old Greenwich, and *William A. Blann*, Stamford, Conn. WATER PURIFICATION. Patent dated July 23, 1946. Disclaimer filed June 28, 1947, by the assignee, *American Cyanamid Company*.

Hereby disclaims claim 1.

[*Official Gazette August 5, 1947.*]